April 30, 1935.  R. C. BRADLEY  1,999,684
OSCILLATING METER
Filed Jan. 20, 1933  2 Sheets-Sheet 1
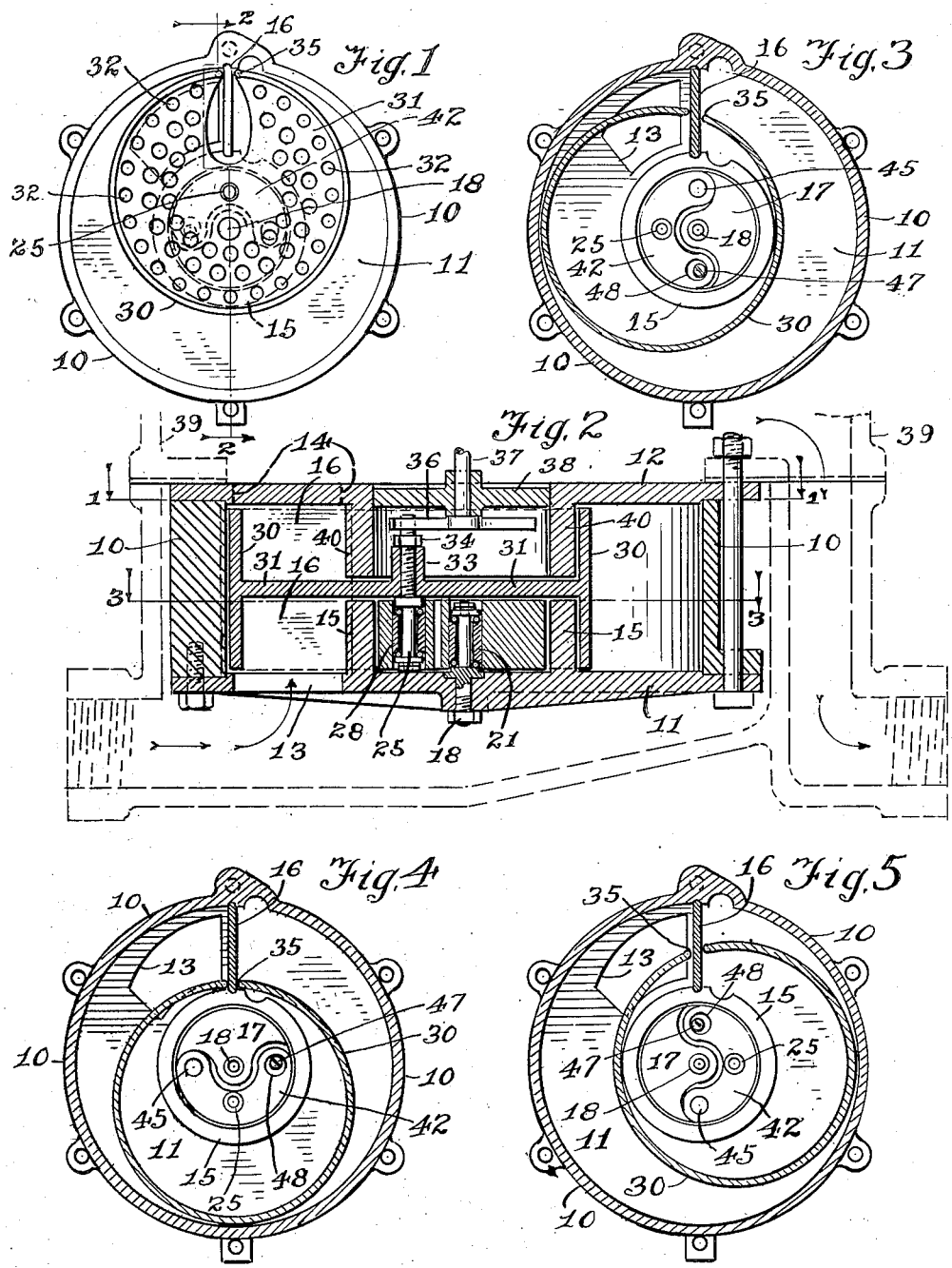

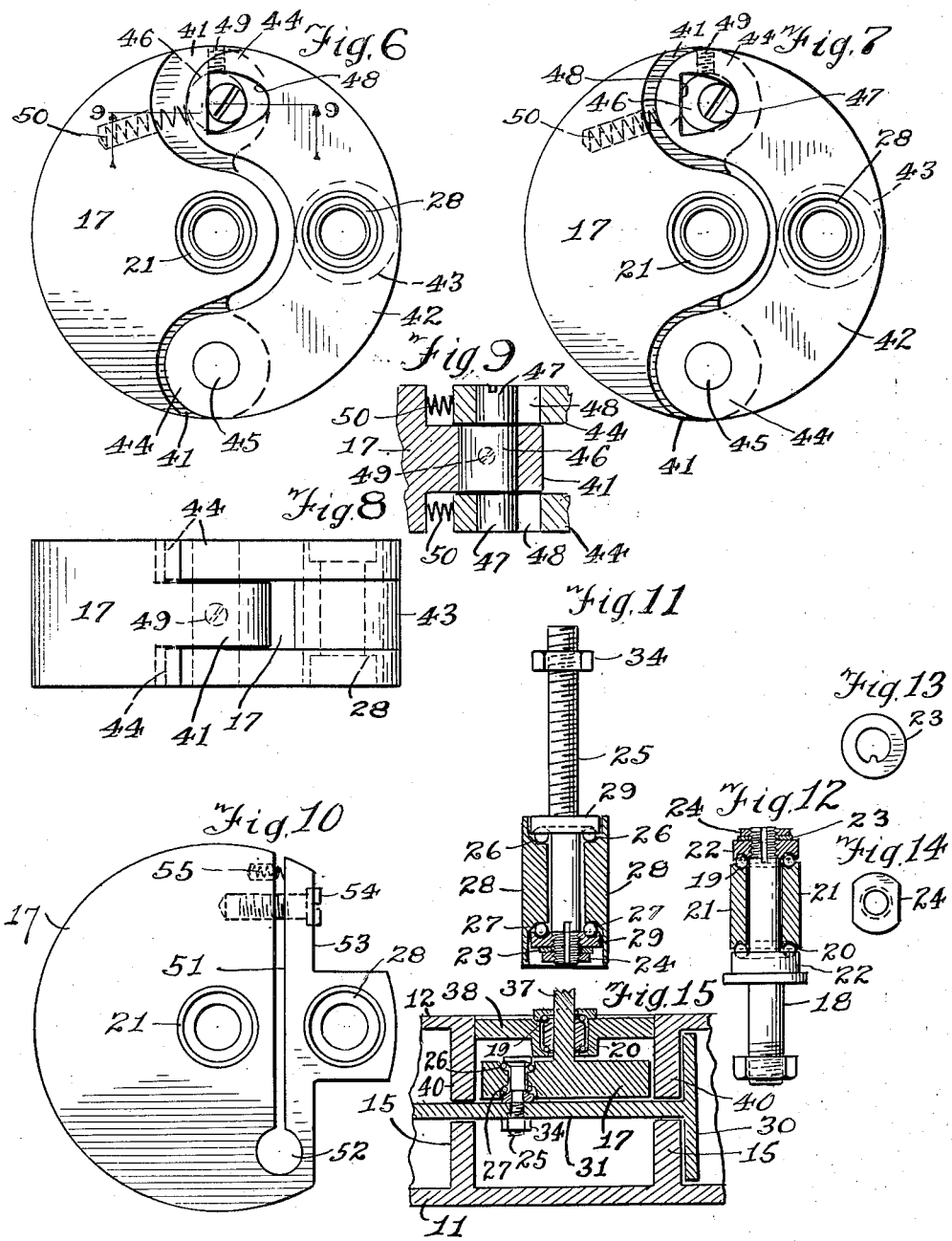

Patented Apr. 30, 1935

1,999,684

UNITED STATES PATENT OFFICE 1,999,684

OSCILLATING METER

Richard C. Bradley, Brooklyn, N. Y., assignor to Fred J. Bradley, St. Albans, N. Y.

Application January 20, 1933, Serial No. 652,674

12 Claims. (Cl. 73—37)

My invention relates to meters of the oscillating piston type, and consists in the matters hereinafter described and then pointed out in the appended claims. Its primary object is to provide a meter of this well-known type in which the piston is suspended in floating position in the measuring chamber in which it operates so that it will not drag on the bottom of the chamber or be lifted by the liquid against the top thereof, and will not contact with the outer wall or the central ring of the chamber, thereby eliminating friction and wear, lessening the resistance to the liquid stream and having less slip-by of the liquid. Further objects are to provide means for adjusting the up and down position of the piston in its chamber, and also means for adjusting the distance or clearance between the piston and chamber wall and which preferably provides for yieldingly holding the piston so that when operating it will give or yield to shock or foreign substances and then return to normal position when the shock ceases or the foreign matter washes out. Further objects will be apparent from the disclosure of the details of the invention.

In the accompanying drawings, which illustrate a practical embodiment of the various features of my invention, and in which the same reference numerals indicate the same or similar parts, Fig. 1 is a top plan view of the measuring-chamber with the cover removed, taken on the line 1—1 in Fig. 2; Fig. 2 is a central vertical sectional view of the case with the cover in place, taken on the line 2—2 in Fig. 1, and showing suitable pipe connections in outline; Figs. 3, 4 and 5 are detail sectional views taken on the line 3—3 in Fig. 2 with the piston in different positions of its movement around the center of the case; Figs. 6 and 7 are top plan views of the piston-sustaining block shown in Fig. 1 with its parts shown in different adjustable relation; Fig. 8 is a side view of the block in side elevation; Fig. 9 is a detail sectional view on the line 9—9 in Fig. 6; Fig. 10 is a top plan view of a modified form of piston-sustaining block; Fig. 11 is a detail view showing the bearing for the piston in its block; Fig. 12 is a detail view showing the bearing for the block in the case; Figs. 13 and 14 are detail views respectively of forms of key-washers and lock-nuts employed, and Fig. 15 is a detail view of parts showing the piston-carrying block mounted on the top of the case.

In the drawings the reference numeral 10 indicates the outer wall of the meter case which is cylindrical in form and provided with a lower head 11 and an upper head or cover 12 removably secured thereto; the lower head has an inlet opening 13 and the upper head an outlet opening 14, of any suitable form and size and in communication respectively with liquid supply and discharge pipes in any suitable manner. The chamber is provided with a central ring 15 concentric with, and of less height than, the wall 10 of the case; and a radial bridge or partition 16 extending from head to head of the case is fixed in the wall and ring between and separating the inlet and outlet to co-operate with the piston to divide the annular chamber between the wall 10 and ring 15 into liquid receiving and discharging spaces. The ring 15 provides a cup-shaped box in which a circular piston-carrying block 17 freely rotates, being carried on a relatively short spindle 18 which is seated at its lower end in the head 11; the block is centrally mounted on the spindle by any suitable anti-friction bearing, preferably by ball-bearings as shown at 19 and 20 rolling in suitable races formed in the ends of an anti-friction sleeve or bushing 21 seated in a central bore in the block and in opposite cones 22 on the spindle, the assembled parts being held in position by a lipped or key-washer 23 and a lock-nut 24, as shown for example in Fig. 12. The bushing is short enough to leave space at each end to accommodate the cones and balls within the bore in the block. A freely oscillating spindle 25 is carried by the block in position eccentric to its supporting spindle 18, and forms the support on which the oscillating piston is suspended in the chamber. The spindle 25 is mounted in the block by any suitable anti-friction bearing, preferably by ball-bearings as at 26 and 27 rolling in suitable races formed in each end of an anti-friction sleeve or bushing 28 seated in an eccentrically located bore in the block and in opposite cones 29 on the spindle, the parts being held in assembly by a key-washer 23 and a lock-nut 24, as shown for example in Fig. 11.

The oscillating piston is in the form of a hollow ring 30 which is of less width than the depth of the chamber in the case and is open from top to bottom, being provided with a transverse centrally located spider or web 31 formed with a plurality of perforations 32 to afford free flow and circulation of the liquid to all parts of the chamber above and below the web. The web is provided with a central hub 33 having screw-threaded engagement with the upper portion of the spindle 25 above the upper cone 29, and locked in place by a nut 34, thereby providing for up and down adjustment of the piston to properly space it for clearance with the chamber heads. The piston has a longitudinal slot 35 extending from end to end of its ring and straddling the partition 16, so that the piston rocks and slides on the latter as its center moves in a circle around the center of the chamber. The parts are so constructed and organized that clearance is maintained as shown in Figs. 1 to 5 between the piston and the outer wall 10 and the inner walls 15 and 40 forming the annular measuring chamber in all positions of the piston in its movements. Also, the width of the ring of the piston is such that it clears the heads of the case as shown in Fig. 2 as it revolves around the center of the latter. In assembling the device the proper position of the piston to provide its clearance with respect to the casing is found by adjusting it on its spindle, and it is then locked on the spindle by the nut 34, as shown in Fig. 2. As the block 17 is held against axial displacement by its ball-bearing being fixed in the bottom of the casing and the piston spindle is held against axial displacement by its ball-bearing being fixed in the block, the piston is set in central position free from drag on the casing and it is locked from being lifted against the casing by the flow of liquid in the chamber. Its mounting not only holds the piston in place against lateral and axial displacement, but it also resists friction created by either up or down stresses on it by the flow of the liquid; the piston oscillates with a minimum of friction under all conditions created by the liquid action. The piston is suspended in floating relation to all the walls of the measuring chamber so that it has entire freedom of movement with respect to the case; it does not drag on the bottom and cannot be thrust up against the top, and is always out of contact with all walls of the chamber. By this organization all friction and wear between the piston and its chamber are eliminated, the resistance of the piston to the stream of liquid passing through the chamber is reduced to a minimum, especially when the carrying parts are mounted on ball-bearings, and as a result the normal path for the liquid through the chamber offers less resistance to the liquid than that between the piston and chamber walls so that the tendency of the liquid to slip-by or waste between these parts is greatly reduced, and the meter is rendered more accurate. The upper end of the spindle 25 in the rotations of the piston around the center of its chamber operates a driver-arm 36 on a shaft 37 which extends through a plug 38 mounted in a central opening in the head 12 and actuates a suitable registering device through proper gears carried in a case on the plug and housed in a cover 39; and a protecting skirt 40 depends from the head 12 around its opening coaxial with the ring 15.

I also provide means to adjust the clearance between the ring 30 and the inner and outer walls of the annular chamber by forming the supporting block 17 to vary the distance between the bearings of the spindles 18 and 25. In the preferred form of this feature of my invention the block 17 is formed in two complementary sections hinged together, as shown in Figs. 6 and 7. The main section is reduced on each of its faces on opposite sides of its central bore for the spindle 18 to form tongues 41 at its periphery; and the movable section 42 is arcuate in contour complementary to the main section and carries in its central body portion 43 the bushing 28 for the piston spindle 25, and it is interiorly cut-away from its central body to its ends to form opposite pairs of parallel spaced wings 44 which overlap and embrace the tongues 41. One pair of wings is hinged to a tongue as at 45, and to adjust the parts a revoluble pin 46 is mounted in the other tongue and formed on its ends with eccentric heads 47 which engage in enlarged holes 48 in the associated wings; a set-screw 49 holds the pin in any desired position, and springs 50 stress the movable section away from the main section and yieldingly hold it against the pin. The holes are of any suitable shape, preferably formed with straight inner walls and curved outer walls, and the arrangement is such that when the pin is set to point its heads away from the main section of the block they abut against the centers of the straight walls and afford maximum play for the movable section without allowing the latter to touch the ring 15, this position being shown in Fig. 6, and allows the movable section to move inwardly upon the main section as shown for example in Fig. 7. By turning the pin in either direction more or less from its central position of Fig. 6 its heads draw the movable section inwardly and correspondingly reduce its play upon the main section. The distance between the block-bearing and the piston-bearing can be varied to provide suitable clearance of the piston from the chamber walls, without interfering with the free rotation of the block in its ring. Also, by this construction the piston is resiliently positioned in its relation to the inner and outer wall of its chamber as the flexible section of its block will move inwardly toward the axis of the block to enable the piston to give or yield to allow any foreign substance in the liquid to pass through the chamber and also to water-hammer or other stresses, and then return to and be stopped in its normal position. The position of the piston axis with relation to the block axis is positively adjusted to set the piston to a desired position where it will clear the chamber and have resilient movement for foreign substances, and the return of the piston is positively controlled and limited so that it cannot go beyond its predetermined position. Also, as the movable section is in skeleton form from its central portion to the ends of its wings, the block is relatively heavy in its main section and light in its complementary section, so that the weight of its main section will counterbalance the weight of the piston carried on its other section. The same advantages and results may be obtained by the modified form of block 17 shown in Fig. 10, in which it is made in one piece formed with an open-end slot 51 extending between the bearings 21 and 28 from one side to near its other side and terminating in an enlarged hole 52 drilled through the block, so that the flexible section 53 carrying the piston is in the form of a spring-arm stressing against the head of a screw 54 which passes freely through it and is adjustably seated in the main section, and an expanding spring 55 may be interposed between the parts if desired. The screw adjusts the spring arm to resiliently set the piston in its desired position, and controls its return to that position after any foreign substance is washed out. The flexible arm preferably is cut-away on each side of its central portion so that the main section will counterbalance the weight of the piston.

The piston may be suspended from the top of the chamber, as shown for example in Fig. 15; the shaft 37 then rotates in ball-bearings 19 and 20 on the plug 38, and the piston block 17 is fixed on the shaft in the skirt 40 and carries the piston-sustaining spindle 25 in ball-bearings 26 and 27 eccentric to the axis of the block.

When the liquid enters the chamber at the inlet port it fills the spaces between the piston ring and the outer and inner chamber walls communicating with this port, and discharges through the spaces between the piston and chamber walls communicating with the outlet port; the piston revolves around the center of the chamber in the path shown in Figs. 1, 3, 4 and 5, and in conjunction with the partition continuously divides the annular measuring chamber into receiving and discharging spaces in communication with the ports so that the liquid flows uninterruptedly through the chamber and its contents are discharged at each oscillation of the piston, the action of the piston continuing so long as liquid is passed into the chamber. In these respects the general operation of the piston is similar to that in the well-known type of oscillating piston meters which have been in wide use for many years, substantially as shown in Patent No. 300,628, dated June 17, 1884. But in these prior meters the piston rests and drags on the lower head in its movements, and in all of its positions of motion its interior face maintains a close contact or joint upon the inner ring or wall of the chamber, and its outer face maintains a close contact or joint with the outer wall of the chamber; the piston continuously wipes the chamber which results in rapid wear of the piston, especially on its lower edge resting on the lower head of the chamber, and it also creates continuous and heavy friction which resists the movement of the piston and increases the resistance of the normal path of the liquid so that much of it slips or wastes through the joints between the piston and chamber walls. Also, in these prior meters shocks due to water-hammer or stresses due to heavy pressure or head of the liquid frequently lifted the piston against the cover or increased its pressure and friction against the chamber walls to cause it to lag or move irregularly with resulting intermittent flow of liquid, and when any particles of foreign matter, such as sand or gravel, entered the chamber they frequently wedged the piston against a wall of the chamber and stopped the operation, necessitating the disassembly of the meter to remove the obstruction. Furthermore, these prior meters could not be used with hot water, gasolene, or other non-lubricating liquids; hot water caused the piston ring to expand into increased friction with the chamber walls which produced lag in the piston's movement and frequently stopped it; gasolene, particularly when it was exposed in service pumps to the sun's rays in warm weather, produced the same difficulties, and the constant use required of these prior meters if employed at gasolene filling stations would produce such rapid wear and deterioration of the pistons by reason of their close contact or joints with the chamber walls that they proved unsatisfactory. In fact, such prior meters are adequate and reliable only when used to meter cold water, as for domestic water service, where the wear of the piston is not rapid as they are infrequently called into operation and then usually only momentarily for a small supply.

My invention obviates these difficulties and objections inherent in these prior devices. As above pointed out in my device the piston is suspended to float in the chamber out of contact with its walls, thereby eliminating friction and wear, reducing resistance in the normal path of the liquid stream and preventing the tendency of the liquid to slip by the piston, thus providing more accurate metering, increasing the capacity and prolonging the life of the meter. It also locks the piston against axial displacement, and provides a flexible suspension of the piston to allow particles of foreign matter to wash out, and to yield to water-hammer or other stresses, with means to adjust and control the position of the flexible member carrying the piston. Furthermore, it enables the meter to be used for hot water, gasolene or other non-lubricating liquids as the piston can be set to allow it to expand without impairing its free floating capability or produce any condition which creates friction or wear upon it or imposes any lag or irregularity in the flow or accurate metering of the liquid. By my invention the life of this type of meter is prolonged indefinitely, the meter has increased capacity as its use is extended to non-lubricating liquids, and it has a wider field of use in that it meets the more exacting requirements of frequent and prolonged operations in metering such liquids.

I claim:

1. In a meter, a measuring chamber, a rotatable block mounted centrally in the chamber, an oscillating piston eccentrically mounted on the block, the chamber and piston being constructed and proportioned relatively to each other to maintain clearance between them in the movements of the piston in the chamber, and means including a ball-bearing constructed to support the piston in the chamber and hold it against axial displacement.

2. In a meter, an annular measuring chamber having a transverse partition between its inlet and outlet ports, an oscillating piston in the chamber having sliding motion on the partition, a spindle carrying the piston in floating relation to the chamber walls, a rotatable block, and a ball-bearing between the block and spindle constructed to lock the spindle against axial displacement in the block.

3. In a meter, a measuring chamber having a rotatable central block, a bearing in the block eccentric to the axis of rotation of the block, a piston carried by said bearing, and means comprising a spring-stressed element to adjust and control the distance of the piston bearing with relation to the axis of the block and resiliently hold the piston in normal operative position.

4. In a meter, a measuring chamber having a central spindle, a block rotatably mounted on the spindle and having an inwardly flexible section, a spindle eccentrically mounted on said section, a piston carried on said latter spindle, a ball-bearing carrying the block on its spindle, and a ball-bearing carrying the piston on its spindle, the ball-bearings being constructed to lock the piston against axial displacement.

5. In a meter, a measuring chamber having a central bearing, a block freely revolving on said bearing and having an inwardly flexible section, a bearing on said section eccentric to the central bearing, a piston on said eccentric bearing, means adjustably connecting the section to the block and constructed to permit inward play of the section and control the outer position of the section while the piston operates, and resilient means to stress the section outwardly against its adjusting means.

6. In a meter, a measuring chamber having a central bearing, a sectional block freely revolving on said bearing and comprising a main section provided with opposite tongues, and a complementary section having end wings co-operating with said tongues, a bearing on said complementary section eccentric to the central bearing, a piston carried on said eccentric bearing, pivotal connections between one set of wings and an associated tongue, the other set of wings having enlarged openings, a pin rotatably mounted in the opposite tongue and having eccentric heads co-operating with said enlarged openings in the other set of wings to adjust the position of the complementary section on the main section, and springs between the sections stressing them apart.

7. In a meter, a measuring chamber having a central bearing, a block freely revolving on said bearing, an eccentric ball-bearing in the block, a rotatable spindle locked against axial movement in said eccentric ball-bearing, a piston adjustably mounted on said spindle, and means to lock the piston on the spindle.

8. In a meter, a measuring chamber having a central removable bearing, a block rotatably mounted on the bearing, an eccentric bearing removably mounted in the block, means to hold the eccentric bearing against axial movement, a piston carried on said eccentric bearing, and means to hold the piston against axial displacement on its bearing.

9. In a meter, a measuring chamber having a central spindle, a block having a central bushing, ball-bearings between the bushing and spindle constructed to hold the bushing against axial displacement, a second bushing mounted in an eccentric bore in the block, a spindle in said second bushing, ball-bearings between said latter spindle and its bushing constructed to hold the spindle against axial displacement, and a piston fixed on the last named spindle.

10. In a meter, a chamber having a central bearing, a rotatable block mounted on said bearing and having a pivoted section, a bearing on said section, an oscillating piston on said latter bearing, means to adjust the piston on its bearing, adjustable connections between the block and section and constructed to permit and control movements of the section toward and away from the block during the operation of the piston, and spring means stressing the section in its outward position in relation to the block.

11. In a meter, a measuring chamber, a rotatable central block in the chamber provided with a resilient skeleton section radially movable during the rotation of the block in the normal operation of the meter, a spindle on the section, a piston centrally mounted on the spindle, and adjustable connections between the block and section constructed to control the movements of the section in relation to the axis of the block during the operation of the piston.

12. In a meter, a measuring chamber, a rotatable central block in the chamber having a relatively movable section, a piston carried by the section, means constructed to adjust and limit the position of the section on the block, and spring means between the block and section constructed to yieldingly hold the section against its adjusting means, the parts being so constructed and arranged that the piston during metering operations may move toward the axis of block and back to its outward position.

RICHARD C. BRADLEY.